(12) United States Patent
Dillie

(10) Patent No.: US 11,980,174 B2
(45) Date of Patent: May 14, 2024

(54) UNDERWATER AIR VACUUM

(71) Applicant: David Dillie, Stafford, CA (US)

(72) Inventor: David Dillie, Stafford, CA (US)

(*) Notice: Subject to any disclaimer, the term of this patent is extended or adjusted under 35 U.S.C. 154(b) by 351 days.

(21) Appl. No.: 17/587,345

(22) Filed: Jan. 28, 2022

(65) Prior Publication Data

US 2023/0240272 A1  Aug. 3, 2023

(51) Int. Cl.
*A01K 63/10* (2017.01)

(52) U.S. Cl.
CPC ................... *A01K 63/10* (2017.01)

(58) Field of Classification Search
CPC ..................................... A01K 63/10
See application file for complete search history.

(56) References Cited

U.S. PATENT DOCUMENTS

2012/0181222 A1* 7/2012 Sherman ............. A01K 63/006
                                                                210/138

* cited by examiner

*Primary Examiner* — Jason Y Ko
(74) *Attorney, Agent, or Firm* — William Gray Mitchell

(57) ABSTRACT

A water tank cleaning tool comprising an underwater air vacuum with separate air and water exhaust channels, allowing the user to vacuum and clean the tank substrate without removing water from the tank.

9 Claims, 3 Drawing Sheets

UNDERWATER AIR VACUUM

CROSS REFERENCE TO RELATED APPLICATIONS

Not applicable.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is an underwater vacuum and water return device and system.

Background of the Invention

Aquariums are widely used for the keeping of fish and other aquatic life, and the market for both aquariums and related equipment is thus quite large. One task required of all aquarium owners is the periodic cleaning of the water and substrate, be it sand, pebbles or otherwise, within the aquarium, as well as the cleaning of the aquarium itself.

One method of cleaning a fish tank or other water tank is to remove the fish and/or other contents into another container, fully drain the water, then clean the tank walls and substrate directly before replacing all contents and conditioning new water. While this method gets the job done, it is highly labor-intensive and is stressful on whatever fish and aquatic creatures are being moved. As a result, most aquarium owners opt for using one of the vacuum devices currently on the market to remove waste material and debris without emptying the tank entirely.

Currently, the only method of "vacuuming" an aquarium is to siphon water/unwanted debris out through a hose. This forces aquarium owners to only vacuum their substrate (which may involve simply turning over the sand or removing debris) when they are doing water changes and/or to do water changes every time they need to vacuum. Siphon-based aquarium vacuuming is also limited in that the floor vacuum rate is restricted to the water flow rate which is usually faster than the vacuum rate. This means an aquarium owner can only vacuum a portion of their aquarium substrate before the water removal is complete, leaving a large portion of the substrate not vacuumed.

What is needed is an underwater vacuum device and system allowing for the return of vacuumed water to the tank, thus enabling the entire substrate area to be treated at one time. The invention as disclosed herein below allows the entire aquarium floor to be vacuumed since it does not remove any water and is not inhibited by a water removal rate.

BRIEF SUMMARY OF THE INVENTION

In a preferred embodiment, an underwater vacuum device for connection to a vacuum pump, such device comprising a handle, housing, air tube venting into a vacuum chamber with a water intake located in the housing, wherein air exiting the air tube moves through the vacuum chamber and draws water from a water tank into the water intake, such air and water passing through a vacuum chamber exit, with water passing into a water chamber and out a water exhaust, and air passing into an air chamber and out an air exhaust.

In another preferred embodiment, the underwater vacuum device as described herein wherein the water exhaust empties back into the aquarium.

In another preferred embodiment, the underwater vacuum device as described herein wherein one or more replaceable filters are located at the water exhaust.

In another preferred embodiment, the underwater vacuum device as described herein wherein the one or more filters are taken from the group consisting of mechanical, chemical or biological.

In another preferred embodiment, the underwater vacuum device as described herein, wherein the air exhaust is an adjustable nozzle.

In another preferred embodiment, the underwater vacuum device as described herein, wherein the water intake also draws in sand substrate, which sand substrate travels through the water chamber and water exhaust with the intaken water.

In another preferred embodiment, an underwater vacuum system, comprising the underwater vacuum device as described herein, wherein the air tube of the vacuum device is attached to an air hose and thence to a vacuum pump located outside the water tank, wherein the device is placed underwater in a water tank, air is pumped into the air tube, causing water and, optionally, sand substrate, to be drawn in and filtered before the air, water and optional sand are returned into the water tank.

In another preferred embodiment, the underwater vacuum system as described herein, wherein the air exhaust is an adjustable nozzle.

In another preferred embodiment, a method of cleaning the water in a water tank, comprising the steps of:
1. connecting the underwater vacuum device as described herein to a vacuum pump with an air hose;
2. submerging the underwater vacuum device with the handle;
3. engaging the vacuum pump;
4. positioning the water intake against the bottom of the water tank or any substrate covering the bottom of the water tank;
5. removing and cleaning the filter periodically; and
6. repeating steps 1-5 until the water has been cleaned.

DETAILED DESCRIPTION OF THE INVENTION

Figure 1:
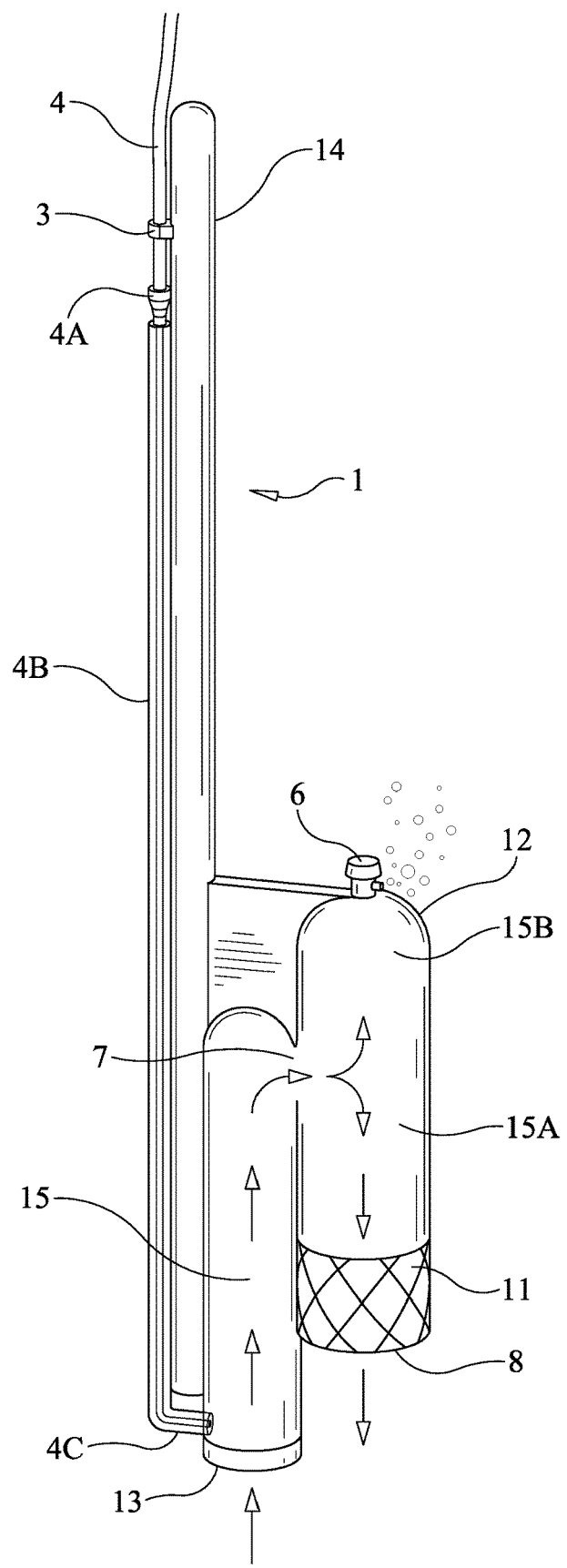
FIG. 1 is a line drawing evidencing an underwater vacuum device for cleaning a water tank or aquarium.

The invention constitutes a vacuum device and system for the cleaning of aquariums or other water tanks, whereby particulates may be removed from the water, air may be expelled into the atmosphere and newly cleaned water can be returned directly to the tank.

This invention can be made using ready-made plastic components, 3D printing, plastic molding, or plastic extrusion among many options. The device itself has no moving parts and consists of a wand handle, ¼" air hose male adapter connected to an air tube with an outlet, a double-chambered vessel comprising a housing, a water intake opening across which air is forced through the air outlet, a vacuum chamber exit wherein the air and water separate, an air chamber with air exhaust nozzle, and a water chamber with water exhaust which can be embodied as a terminal in the chamber, a tube or some other shape which can allow the free flow of water and/or be fitted with filters of various types.

The device is plugged into an air pump via a preferably ¼" air hose (both the pumps and air hose are commonly owned by aquarium owners and readily available at all pet stores, and varying sizes and specifications are interchangeable). The air is forced down to the bottom of the handle where it makes a ninety degree turn into a vacuum chamber within the housing. As air is forced into this tube, it rises in bubbles and draws water from the aquarium or tank through the water intake and the vacuum chamber. The air flow creates a suction of water at the bottom of the water intake tube.

This air and water flow is then separated as the mixture passes out the vacuum chamber exit, where the air bubbles rise to the air exhaust nozzle which must calibrated to allow only a specific, regulated amount of air exhaust. Precise air exhaust regulation is important because, if the air flow is too low, the water cannot circulate, while if the air flow out is too high, sand can clog the passageway and/or water can escape with the air. Regulation of the nozzle can reflect the water pressure due to the size of the tank, water temperature and other variables.

As air is removed, the remaining water is recirculated back down out of the water exhaust. The water exhaust can be unfiltered or filtered with basket or bag filters of various particle filtration sizes. The device creates a water suction which can be used to suck of debris and unwanted materials from the aquarium substrate, or to recirculate sand.

The invention allows the operator to vacuum the substrate of an aquarium without removing water from the aquarium and without submerging any electrical wires or components into the water. Currently, the only method of "vacuuming" an aquarium is to siphon water/unwanted debris out through a hose. This forces aquarium owners to only vacuum their substrate (which may involve simply turning over the sand or removing debris) when they are doing water changes and/or to do water changes every time they need to vacuum. Siphon-based aquarium vacuuming is also limited in that the floor vacuum rate is restricted to the water flow rate which is usually faster than the vacuum rate. This means you can only vacuum a portion of your aquarium substrate before the water removal is complete leaving a large portion of the substrate not vacuumed.

In a potential alternate embodiment, an extension may be attached to the water intake, allowing for greater control over the exact areas within the tank to be vacuumed. Such extension may comprise a flexible type of tubing, such that the extension may be placed into different configurations for vacuuming around or behind structures. A feature such as an algae scraper may also be employed to clean algae from the inner surfaces of the tank.

This invention allows the entire floor of the tank or aquarium to be vacuumed since it does not remove any water and is not inhibited by a water removal rate.

DETAILED DESCRIPTION OF THE FIGURES

FIG. 1 shows an underwater vacuum device 1 for cleaning a water tank or aquarium 20 (not pictured). The device consists of a housing 12 connecting to a handle 14 with a distal end and proximal end, such housing comprising a water intake 13, embodied as a one-way valve, allowing water intake but preventing outflow, leading into a vacuum chamber 15 that empties into a second space comprising a water chamber 15A and air chamber 15B. In a preferred embodiment, the valve of water intake 13 is a "regulator valve", as known in aquarium nomenclature. The handle and housing will preferably be made of one or more hard plastics, such as but not limited to, PETE, HDPE, PVC, vinyl, LDPE, polypropylene, polystyrene, etc. It will also be preferable for the housing, and generally the handle as well, to be transparent, so the user can fully see the movement of fluids and particulates within.

The vacuum action emanates from air hose 4, which extends from a vacuum pump (not pictured) outside the tank and delivers forced air, such air hose affixed to the handle with air hose holder 3, such air hose holder stabilizing the air hose for connection to an air hose connector 4A and thence to an air tube 4B running the length of the handle. In the embodiment of FIG. 1, the air tube is a flexible tube of rubber or plastic that is adhered partly or completely to one side of the handle with a commercially available waterproof adhesive. Preferred adhesives for use in underwater aquarium devices include, without limitation, hot glue, urethane- or acrylic-based adhesives, PEBA or one- or two-part silicone adhesives.

The handle 14 is attached to or integrated with an outer side of the housing 12 and is held by a user to move and position the device within the tank. As air is forced through the air tube 4B, such air exits the tube through air outlet 4C, which vents through the housing 12 and into vacuum chamber 15. In the embodiment of FIG. 1, the air outlet is embodied as a valve connected to an end of the air tube and extending into a hole in the vacuum chamber portion of the housing. The movement of the vented air into the vacuum chamber passes the water intake 13, in the housing wall at the base of the vacuum chamber, thus vacuuming water from outside the water intake into the vacuum chamber, wherein the water is mixed with the moving air while moving upwards towards vacuum chamber exit 7.

As a user will hold the underwater vacuum by the distal end of the handle with the water intake facing approximately downward towards the bottom of a water tank, vacuum chamber exit 7 will vent approximately horizontally into a second space comprising water chamber 15A, located below the vacuum chamber exit and air chamber 15B, located above the vacuum chamber exit. Based on such positioning, air will naturally move upward through the air chamber, and be vented out of the housing through an air exhaust 6 in the housing at the end of the air chamber. In a preferred embodiment, the air exhaust will be embodied as an adjustable nozzle, which can be adjusted to regulate the air flow through the larger device and thus the power of the vacuum. Similarly, water will naturally move downward into the water chamber and out through a water exhaust 8 in the housing at the end of the water chamber.

One or more filters 11 will be located within the area of the water exhaust for capturing particulates to be removed from the water tank. Such filters are to removable and preferably reusable, and can be taken from the standard types used in aquarium filtering systems, including mechanical, chemical and biological filters, or combinations thereof. Such filter may comprise, without limitation, sponges, floss pads, pre-filter media, peat moss, activated carbon, zeolite, ceramic rings, bio sponges, bio balls, and any other known water filtration material. In a preferred embodiment, the water intake 13 will allow for the intake of a certain amount of sand substrate, and the filter at the water exhaust will be of a loose enough weave to allow for sand to pass while capturing excreted wastes, uneaten food and other unwanted particulates. As an added benefit, the uptake and replacement of sand will have an oxygenating effect.

The air hose 4 may be made of any commercially available plastic or rubber tubing. The air tube may also be made of flexible tubing, but may also be comprised of hardened rubber, metal or plastic tubing. Air hose connector 4A may be embodied as a standard hose barb, an inline valve or other known means of hose connection. Air hose holder 3 is preferably embodied as a plastic clamp or ring into which flexible tubing may be inserted. The one-way or check valve of the water intake 13 can be embodied as a straight or right angle valve, with any of a thread, plate or flange connection, or any other commercially available one-way valve.

Figure 2:
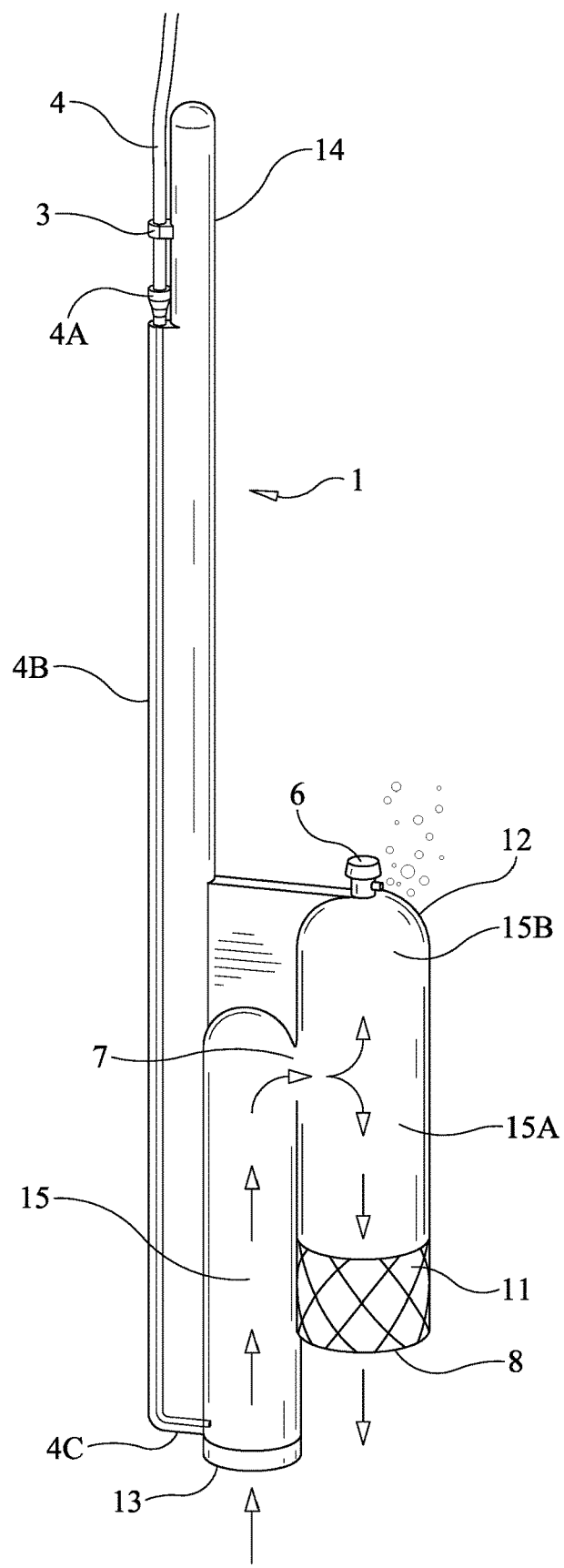
FIG. 2 is a line drawing evidencing an alternate embodiment of the underwater vacuum device of FIG. 1.

FIG. 2 shows an alternate embodiment of the underwater vacuum device of FIG. 1, wherein the handle 14 is made from hard plastic, with air tube 4B integrated into the handle as a tube running the length of the handle, beginning the air hose connector 4A for connection to the air hose 4 and ending at the air outlet 4C, which empties into vacuum chamber 15. In the embodiment of FIG. 2, the end of the integrated air tube is itself the air outlet. The embodiment of FIG. 2 also shows the use of a second filter 11 in or over the water intake 13, of a grade sufficient to block sand intake but allow water intake. In a preferred embodiment, the handle and housing are made by extrusion, injection-molding, 3d printing or a similar means of manufacture.

Figure 3:
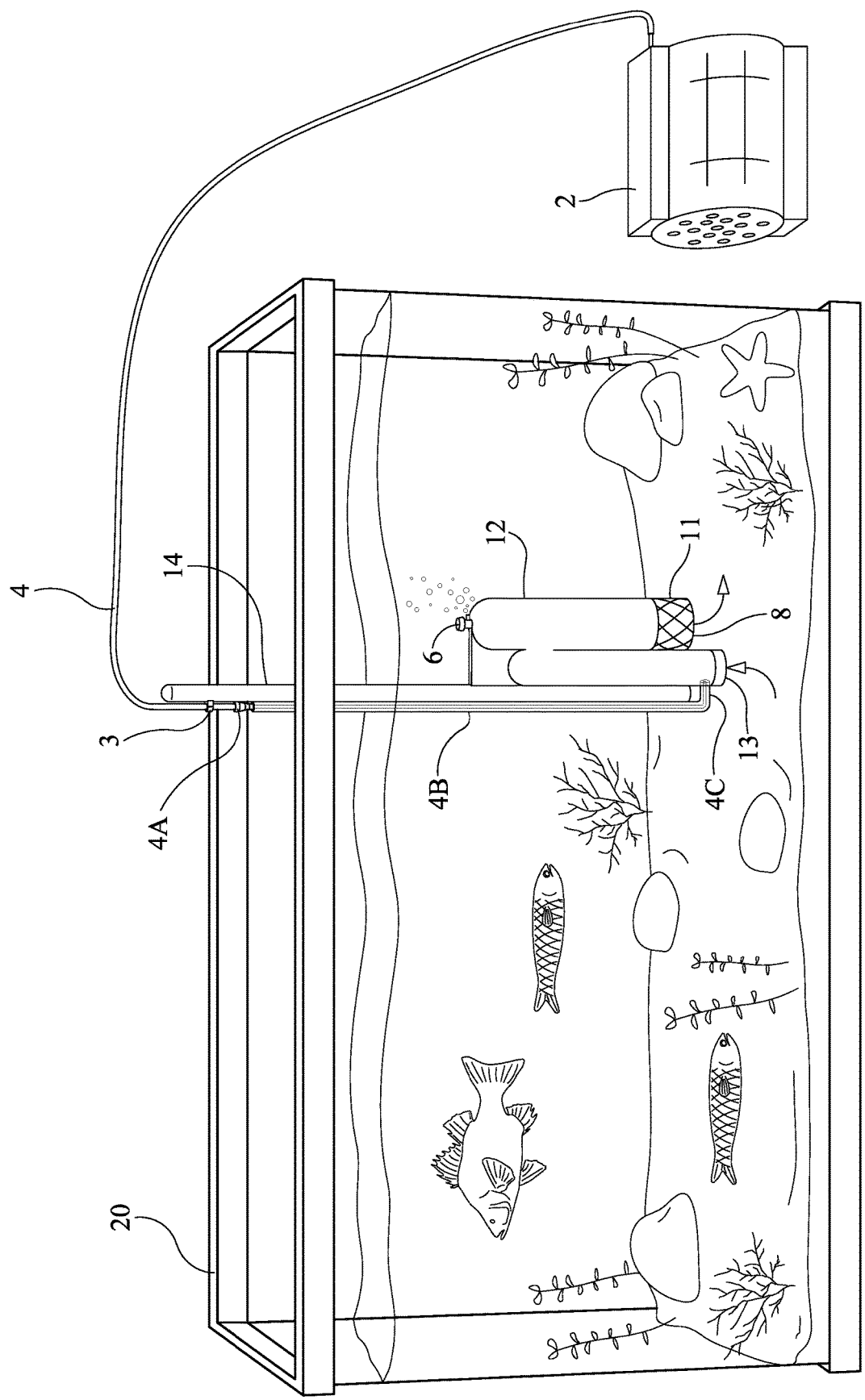
FIG. 3 is a line drawing evidencing an underwater vacuum system in use, including the device of FIG. 1.

FIG. 3 shows the underwater vacuum device of FIG. 1, attached via air hose 4 to a vacuum pump 2, and cleaning the substrate 21 inside an aquarium 20.

LIST OF REFERENCE NUMBERS

1 Underwater vacuum
2 Vacuum pump
3 Air hose holder
4 Air hose
4A Air hose connector
4B Air tube
4C Air outlet
6 Air exhaust
7 Vacuum chamber exit
8 Water exhaust
9 Power source
10 Power cord
11 Filter(s)
12 Housing
13 Housing cap
14 Handle
15 Vacuum chamber
15A Water chamber
15B Air chamber
20 Aquarium
21 Substrate The references recited herein are incorporated herein in their entirety, particularly as they relate to teaching the level of ordinary skill in this art and for any disclosure necessary for the more common understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

I claim:

1. An underwater vacuum device for connection to a vacuum pump, such device comprising a handle, housing, air tube venting into a vacuum chamber with a water intake located in the housing, wherein air exiting the air tube moves through the vacuum chamber and draws water from a water tank into the water intake, such air and water passing through a vacuum chamber exit, with water passing into a water chamber and out a water exhaust, and air passing into an air chamber and out an air exhaust.

2. The underwater vacuum device of claim 1, wherein the water exhaust empties back into the aquarium.

3. The underwater vacuum device of claim 1, wherein one or more replaceable filters are located at the water exhaust.

4. The underwater vacuum device of claim 3, wherein the one or more filters are taken from the group consisting of mechanical, chemical or biological.

5. The underwater vacuum device of claim 1, wherein the air exhaust is an adjustable nozzle.

6. The underwater vacuum device of claim 1, wherein the water intake also draws in sand substrate, which sand substrate travels through the water chamber and water exhaust with the intaken water.

7. An underwater vacuum system, comprising the underwater vacuum device of claim 3, wherein the air tube of the vacuum device is attached to an air hose and thence to a vacuum pump located outside the water tank, wherein the device is placed underwater in a water tank, air is pumped into the air tube, causing water and, optionally, sand substrate, to be drawn in and filtered before the air, water and optional sand are returned into the water tank.

8. The underwater vacuum system of claim 7, wherein the air exhaust is an adjustable nozzle.

9. A method of cleaning the water in a water tank, comprising the steps of:
   1. connecting the underwater vacuum device of claim 3 to a vacuum pump with an air hose;
   2. submerging the underwater vacuum device with the handle;
   3. engaging the vacuum pump;
   4. positioning the water intake against the bottom of the water tank or any substrate covering the bottom of the water tank;
   5. removing and cleaning the filter periodically; and
   6. repeating steps 1-5 until the water has been cleaned.

* * * * *

UNITED STATES PATENT AND TRADEMARK OFFICE
CERTIFICATE OF CORRECTION

PATENT NO. : 11,980,174 B2
APPLICATION NO. : 17/587345
DATED : May 14, 2024
INVENTOR(S) : David Dillie Page 1 of 1

It is certified that error appears in the above-identified patent and that said Letters Patent is hereby corrected as shown below:

On the Title Page

Item (71) should read:
Applicant: David Dillie, Stafford, VA (US)

Item (72) should read:
Inventor: David Dillie, Stafford, VA (US)

Signed and Sealed this
Twenty-second Day of October, 2024

Katherine Kelly Vidal
*Director of the United States Patent and Trademark Office*